(12) United States Patent
Shelton et al.

(10) Patent No.: US 12,076,683 B2
(45) Date of Patent: Sep. 3, 2024

(54) SYSTEM, METHOD, AND APPARATUS FOR AMELIORATING DEPOSITS IN SELECTIVE CATALYTIC REDUCTION SYSTEMS FOR THE REDUCTION OF NITROGEN OXIDE EMISSIONS IN STEAM METHANE REFORMERS

(71) Applicant: Integrated Global Services Inc., Richmond, VA (US)

(72) Inventors: Jefferson Landers Shelton, Jacksonville, AL (US); Mark Braithwaite, Jr., Richmond, VA (US); Jan Albert Schutte, Midlothian, VA (US); Morgan Watson, Chesterfield, VA (US)

(73) Assignee: Integrated Global Services Inc., Richmond, VA (US)

( * ) Notice: Subject to any disclaimer, the term of this patent is extended or adjusted under 35 U.S.C. 154(b) by 811 days.

(21) Appl. No.: 17/301,879

(22) Filed: Apr. 16, 2021

(65) Prior Publication Data

US 2021/0322911 A1    Oct. 21, 2021

Related U.S. Application Data

(60) Provisional application No. 63/011,230, filed on Apr. 16, 2020.

(51) Int. Cl.
*B01D 46/10* (2006.01)
*B01D 39/10* (2006.01)
(Continued)

(52) U.S. Cl.
CPC ............ *B01D 46/62* (2022.01); *B01D 39/10* (2013.01); *B01D 46/10* (2013.01); *B01D 46/69* (2022.01);
(Continued)

(58) Field of Classification Search
CPC .. B01D 29/0018; B01D 29/02; B01D 29/035; B01D 39/10; B01D 39/1692;
(Continued)

(56) References Cited

U.S. PATENT DOCUMENTS 3,545,939 A * 12/1970 Cox, Jr. ................. B01J 8/0446
423/376
3,863,359 A * 2/1975 Grega ..................... F26B 3/082
422/143

(Continued)

FOREIGN PATENT DOCUMENTS

WO      2010112781 A1    10/2010

OTHER PUBLICATIONS

International Search Report and Written Opinion; PCT/US21/70403; mailed Jun. 28, 2021.

*Primary Examiner* — Minh Chau T Pham
(74) *Attorney, Agent, or Firm* — Squire Patent Consulting & IP Law LLC; Brendan E. Squire (57) ABSTRACT

A system, method, and apparatus for ameliorating deposits in selective catalytic reduction systems for the reduction of nitrogen oxide emissions in steam methane reformers. The system includes positioning a dual stage refractory particulate (RP) filter placed in an upstream airflow from a Selective Catalytic Reduction System (SCRS). The first stage is formed of a perforated steel plate with a second stage formed of a wire mesh screen. The system may employ air cannons to clean each of the first stage and the second stages.

23 Claims, 7 Drawing Sheets

(51) Int. Cl.
*B01D 39/12* (2006.01)
*B01D 46/62* (2022.01)
*B01D 46/69* (2022.01)
*B01D 46/71* (2022.01)
*B01D 51/00* (2006.01)
*B01D 53/86* (2006.01)

(52) U.S. Cl.
CPC ............. *B01D 46/71* (2022.01); *B01D 51/00* (2013.01); *B01D 53/8631* (2013.01); *B01D 2257/404* (2013.01); *B01D 2267/40* (2013.01)

(58) Field of Classification Search
CPC .. B01D 46/0026; B01D 47/028; B01D 53/86; B01D 2029/033; B01D 2201/307; B01D 2201/32; B01D 2201/4023; B01D 2201/44; B01D 2313/143; B01D 2313/23; B01D 2313/42; B07B 1/04; B07B 1/469; B07B 11/06; B07B 13/16; B07B 9/02; B07B 13/10; F27D 1/0003; F27D 2003/185; F27D 2099/0086

USPC ....... 422/177, 173, 143, 168, 311; 55/385.3, 55/DIG. 28, DIG. 30; 123/198 E
See application file for complete search history.

(56) References Cited

U.S. PATENT DOCUMENTS

| | | | | |
|---|---|---|---|---|
| 3,910,755 | A | * | 10/1975 | Syska .................... F27B 15/14 |
| | | | | 432/15 |
| 4,159,305 | A | * | 6/1979 | Moorey ................ B01J 8/1818 |
| | | | | 432/15 |
| 4,213,938 | A | * | 7/1980 | Pyzel ..................... F27B 15/00 |
| | | | | 432/15 |
| 4,226,830 | A | * | 10/1980 | Davis ........................ B01J 8/32 |
| | | | | 110/263 |
| 4,317,798 | A | * | 3/1982 | Worley ................ C10G 11/182 |
| | | | | 432/15 |
| 4,532,108 | A | | 7/1985 | Becht, IV |
| 2007/0104622 | A1 | | 5/2007 | Zuberi et al. |
| 2007/0274876 | A1 | | 11/2007 | Chiu et al. |
| 2010/0275585 | A1 | | 11/2010 | Burkhardt |

\* cited by examiner

SYSTEM, METHOD, AND APPARATUS FOR AMELIORATING DEPOSITS IN SELECTIVE CATALYTIC REDUCTION SYSTEMS FOR THE REDUCTION OF NITROGEN OXIDE EMISSIONS IN STEAM METHANE REFORMERS

CROSS-REFERENCE TO RELATED APPLICATION

This application claims the benefit of priority of U.S. provisional application No. 63/011,230 filed Apr. 16, 2020, the contents of which are herein incorporated by reference.

BACKGROUND OF THE INVENTION

The present invention relates to emissions reduction in industrial processes, and more particularly to reduction of nitrogen oxide (NOx) emissions in industrial processes.

Nitrogen oxide environmental regulations are forcing operators of steam methane reformers (SMR), fired heaters, and other industrial process reformers to install Selective Catalytic Reduction Systems (SCRS) to reduce NOx emissions. The SCR systems are downstream devices that convert nitrogen oxides into gaseous nitrogen and water. This is accomplished by the use of a catalyst bed and a gaseous reductant, typically anhydrous ammonia.

The use of SCR systems is common in coal fired utility plants, where the SCR systems frequently achieve over 90% reduction in NOx emissions. Similar SCR systems are also used with crude oil and biomass boilers, and in furnaces employed in the glass industry. The use of SMRs were originally thought to be a simple application because they produce less ash particles than the other applications. However, ash particles and refractory fiber blockage create major operational problems for SCRs.

Figure 1:
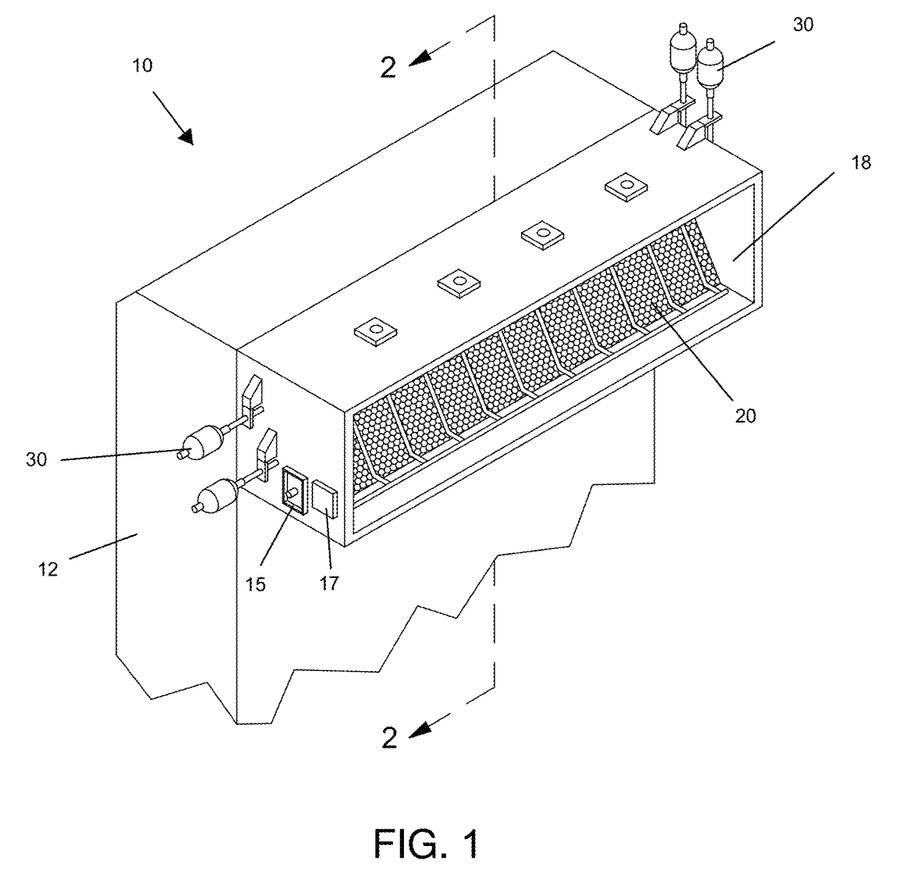
FIG. 1 is a front perspective view of a steam methane reformer and refractory liner carrying an air flow to a selective catalytic reduction system for the reduction of nitrogen oxide emissions in an exhaust airflow (A).

As seen in reference to FIG. 1, ash in coal fired boiler applications can block airflow in the SCR catalyst beds and cause millions of dollars in operational and maintenance costs. Buildup like this is common in coal fired SCRs. Poor ash flow distribution, poor cleaning devices and LPA (large particle ash) are its most common causes.

Most of the causes for buildup in coal fired applications are not present in an SMR systems due to low particle loading. However, the two applications share one common issue: particulate blockage. Significant sources of refractory particulate and fibers in an SMR comes from the refractory ceramic fibers and/or the insulating brick castable.

Figure 2:
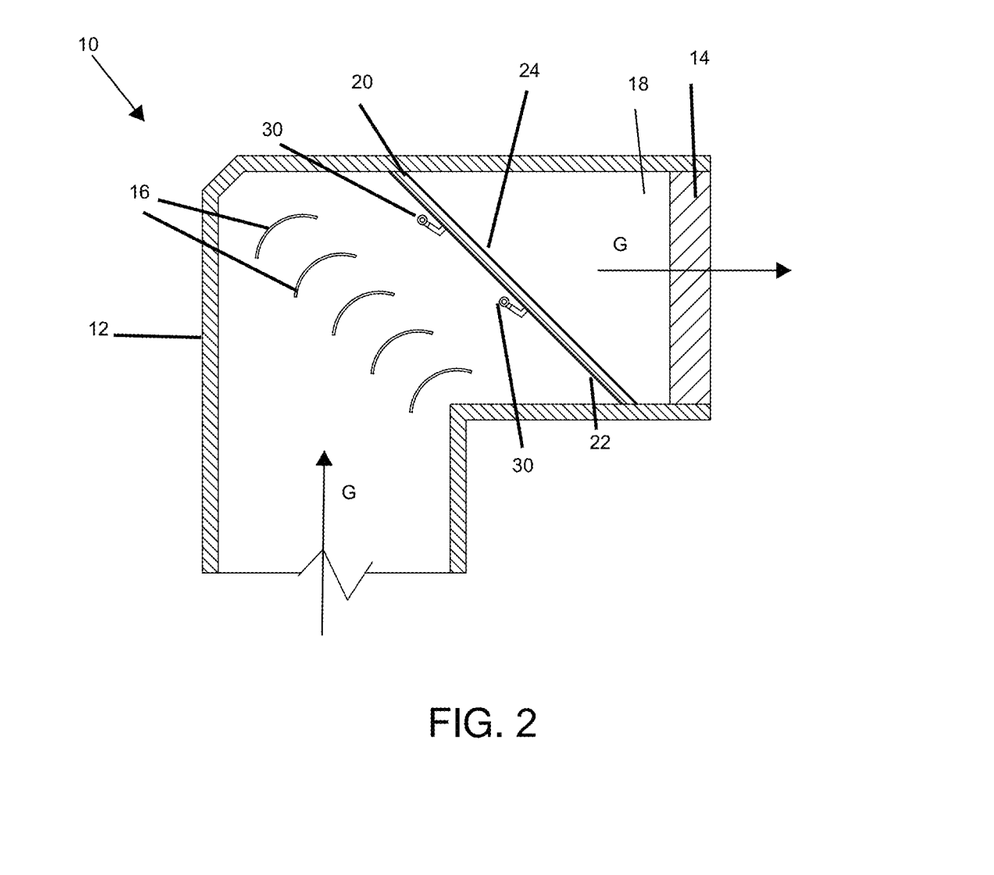
FIG. 2 is a side sectional view of the stem methane reformer refractory liner taken along line 2-2 of FIG. 1 showing a first positioning of a dual screen element.
Figure 3:
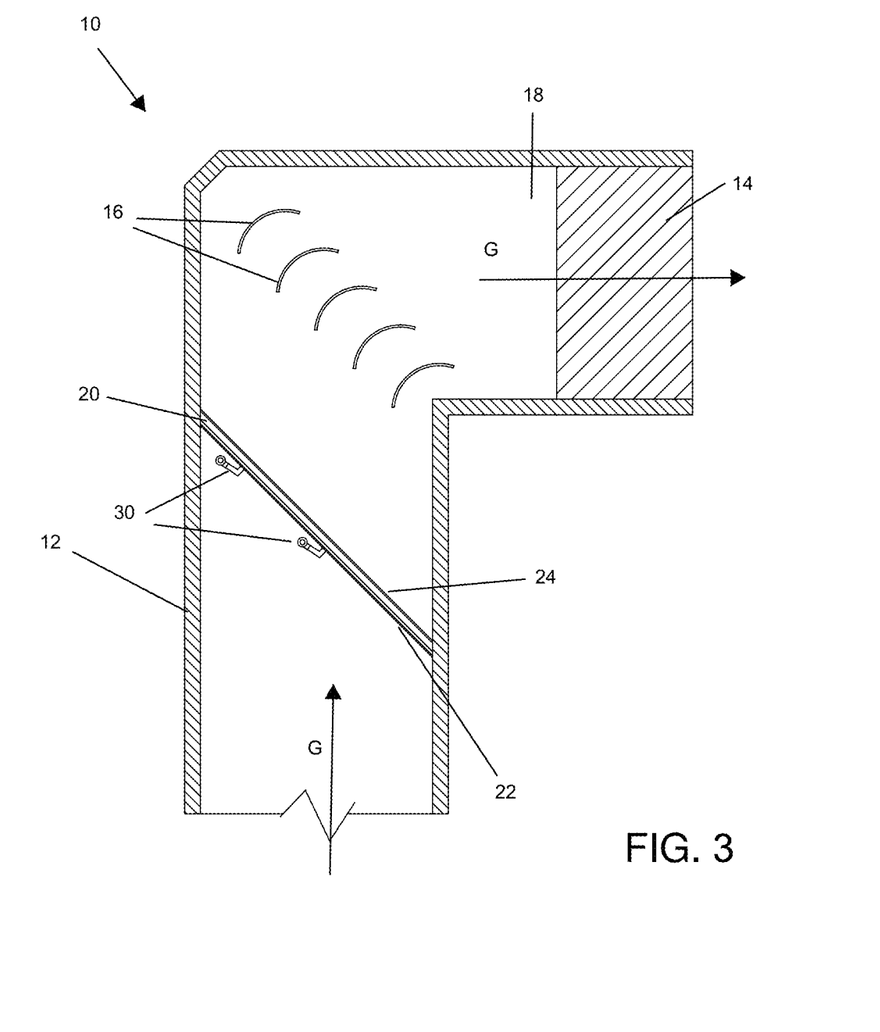
FIG. 3 is a side sectional view of the stem methane reformer refractory liner taken along line 2-2 of FIG. 1 showing a second positioning of a dual screen element.

The presence of SCR occlusion in SMRs is an expensive issue. The occlusion often forces plants to run at reduced outputs or in worst case scenarios, to shut down for manual cleaning operations. The estimated opportunity cost for an SMR to be down for one day is $1,000,000. Each shutdown to perform manual cleaning procedures lasts an average length of 3 days. The duration of the shutdowns are lengthy because the SMR units take time to cool down before the cleaning operations can be performed. The photos in FIGS. 2 and 3 show buildup on the catalyst that forced the SMR to be taken offline to be cleaned.

Efforts to prevent this buildup have included one or more of the following techniques:

Sonic horns—Test showed that sonic horns would not move the buildup. The buildup is typically bigger than the catalyst pitch, which renders the sonic horn ineffective. Accordingly, sonic horns are not a solution for this problem.

Soot blowers—It is believed that soot blower solutions have not been employed because operators fear that the soot blower would cause damage by driving accumulated buildup into the catalyst bed. This condition has been experienced in several other industries. Accordingly, soot blowers do not appear to be a viable solution.

Manual Cleaning System with the unit online—Manual cleaning operations may be performed while the SMR is online.

Ceramic Lining the Entire SMR—Plant operators often do not know the source of buildup. This solution is costly and has proven unsuccessful among the plants that have attempted it.

As can be seen, there is a need for improved apparatus and methods for alleviating large particle ash build up in the SCR of SMR operating plants.

SUMMARY OF THE INVENTION

In one aspect of the present invention, an apparatus for reducing blockage of a catalyst bed in a coal fired refractory is disclosed. The apparatus includes a dual element screen having a first stage and a second stage disposed within a frame at a desired separation distance between the first stage and the second stage. The first stage is formed as a perforated steel plate having a plurality of apertures defined through a thickness of the perforated steel plate. The plurality of apertures are defined in a spaced apart relation throughout a surface of the first stage. The perforated steel plate has a first open area ratio (OAR) between the plurality of apertures and a surface of the perforated steel plate of at least 30%. The second stage is formed as a wire mesh screen having a second OAR between a pore and a surface area of the wire mesh screen of at least 30%.

In some embodiments, the first OAR may be between 30% and 80%. The second OAR may be between 30% and 80%.

In some embodiments, the apertures is between 1 mm to 5 mm. More preferably, the size of the apertures is about 1.9 mm.

In some embodiments, a pore opening of the pore may be between 0.002 mm and 0.2 mm. In preferred embodiments, the pore opening is 0.0345 mm.

In some embodiments, a thickness of the perforated steel plate is between 10 gauge and 18 gauge. In a preferred embodiment, the thickness of the perforated steel plate is about 16 gauge.

In some embodiments, a wire thickness of the wire mesh screen is between 0.14 mm to 0.1 mm. In a preferred embodiment, a wire thickness of the wire mesh screen is 0.28 mm.

In other embodiments, the desired separation distance provides a turbulence zone between the perforated steel plate and the wire mesh screen, whereby a turbulent exhaust gas flow in the turbulence zone orients a particulate fiber entrained in an exhaust gas flow in a non-perpendicular contact with the wire mesh screen.

In other aspects of the invention, a system for reducing particulate blockage of a catalyst bed in a coal fired refractory of a steam methane reformer is disclosed. The coal fired refractory producing an exhaust gas flow in which a quantity of a refractory particulate (RP) contaminant and a stringed refractory fiber (RF) contaminant are carried in the exhaust gas flow. The exhaust gas flow is carried within an exhaust shaft of the coal fired refractory having an outlet opening to the catalyst bed. The system includes, a dual screen element having a first stage positioned in an upstream direction in the exhaust gas flow. A second stage is positioned in a downstream direction from the first stage. The dual screen element is disposed at an offset angle from a longitudinal axis of the exhaust shaft. The dual screen element is positioned upstream in the exhaust gas flow from the catalyst bed. The first stage is formed as a perforated steel plate having a plurality of apertures defined through a thickness of the perforated steel plate. The plurality of apertures are defined in a spaced apart relation throughout a surface of the first stage. The perforated steel plate has a first open area ratio (OAR) between the plurality of apertures and the surface of the perforated steel plate of at least 30%. The second stage is formed as a wire mesh screen having a second OAR between a pore and a mesh surface area of the wire mesh screen of at least 30%.

In some embodiments, an area of the plurality of apertures is at least equal to a cross sectional area bounded by the exhaust shaft.

In some embodiments, the first stage and the second stage are spaced apart by a separation distance in which a turbulence zone in the exhaust gas flow downstream from the first stage prevents the stringed RF from flowing in a perpendicular orientation relative to the second stage.

In some embodiments, a first blast of a plurality of air cannon oriented at a front surface of the dual screen element is directed at a high pressure and a low volume to clear accumulation of the RP and the RF from the dual screen element.

In some embodiments, a second blast of the plurality of air cannon oriented on a back surface of the dual screen element is regulated as a low pressure and a high-volume blast.

In some embodiments, at least one of the first blast and the second blast convert the RF captured by the dual screen element to a particulate for entrainment with the exhaust gas flow through the catalyst bed.

In some embodiments, the dual screen element is positioned in a vertical exhaust shaft upstream of the exhaust gas flow from a turn to a horizontal exhaust shaft.

In other embodiments, the dual screen element is positioned in a horizontal exhaust shaft downstream from a turn from a vertical exhaust shaft.

In other aspects of the invention, a system for reducing particulate blockage of a catalyst bed in a coal fired refractory is disclosed. The coal fired refractory producing an exhaust gas flow in which a quantity of a refractory particulate contaminant are carried in the exhaust gas flow. The exhaust gas flow carried within an exhaust shaft having an outlet opening to the catalyst bed. The system includes a dual screen element having a first stage, positioned in an upstream direction in the exhaust gas flow, and a second stage positioned in a downstream direction from the first stage. The dual screen element is disposed at an offset angle from a longitudinal axis of the exhaust shaft. The dual screen element is positioned upstream in the exhaust gas flow from the catalyst bed. The first stage is formed as a perforated steel plate having a plurality of apertures defined through a thickness of the perforated steel plate. The plurality of apertures are defined in a spaced apart relation throughout a surface of the first stage. When disposed at the offset angle, the perforated steel plate has an aperture opening area at least equal to a cross sectional area bounded by the exhaust shaft. The second stage is formed as a wire mesh screen spaced apart from the first stage by a separation distance.

In some embodiments, the separation distance provides a turbulence zone in the exhaust gas flow downstream from the first stage, wherein the turbulence zone prevents a stringed refractory fiber contaminant from flowing in a perpendicular orientation relative to the second stage.

In some embodiments, the dual screen element also includes a first open area ratio (OAR) between the plurality of apertures and the surface of the perforated steel plate of at least 30%. The dual screen element also includes second OAR between a pore and a mesh surface area of the wire mesh screen of at least 30%.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide a system, method, and apparatus for alleviating refractory particulate (RP) build up in a Selective Catalytic Reduction System (SCR) employed to reduce nitrogen oxide (NOx) emissions in a steam methane reformer (SMR). Prevention of RP buildup in the SCR catalyst bed improves the efficiency of the catalytic reaction to thereby reduce the quantity of NOx emissions.

A representative SCR system 10 is shown in FIGS. 1-3. The SCR system 10 includes a refractory liner 12 to carry an exhaust gas flow G from a coal fired furnace (not shown). The exhaust gas flow G is carried to an outlet 18 coupled to a catalyst bed 14. A dual screen element 20 is positioned at an angled relationship across the exhaust gas flow G conveyed through the refractory liner 12. A plurality of guide vanes 16 are disposed in a spaced apart relation and oriented to facilitate a turning movement of the exhaust gas flow G to direct the exhaust gas flow G through the catalyst bed 14. The outlet 18 has a generally horizontal orientation following a 90-degree bend from the vertical shaft.

An access door 15 may be provided at an upstream side of the dual screen element 20 for inspection, cleaning, and maintenance. A portal 17 may also be provided downstream of the screen element 20 between the outlet 18 and the catalyst bed 14 to permit access for inspection, cleaning, and maintenance. The SCR system 10 may also include a plurality of air cannon 30 for cleaning of RP buildup on the dual screen element 20.

Aspects of the present invention include the installation of a screen element 20 in a exhaust gas flow G to the SCR catalyst bed 14 to solve the issue of RP buildup in the catalyst bed 14.

A representative screen element 20 is shown in reference to FIGS. 4-6B. In some aspects of the invention, the screen element 20 may be either a single stage or a dual stage element. The dual screen element 20 includes a first stage formed of perforated steel plate 22 and a second stage formed of a wire mesh screen 24. The first stage and the second stages are mounted within a plurality of frame elements 28 to provide a space between the first stage and the second stages. When employed as a single stage, the screen element 20 may employ one of the perforated steel plate 22 or the wire mesh screen 24.

Figure 4:
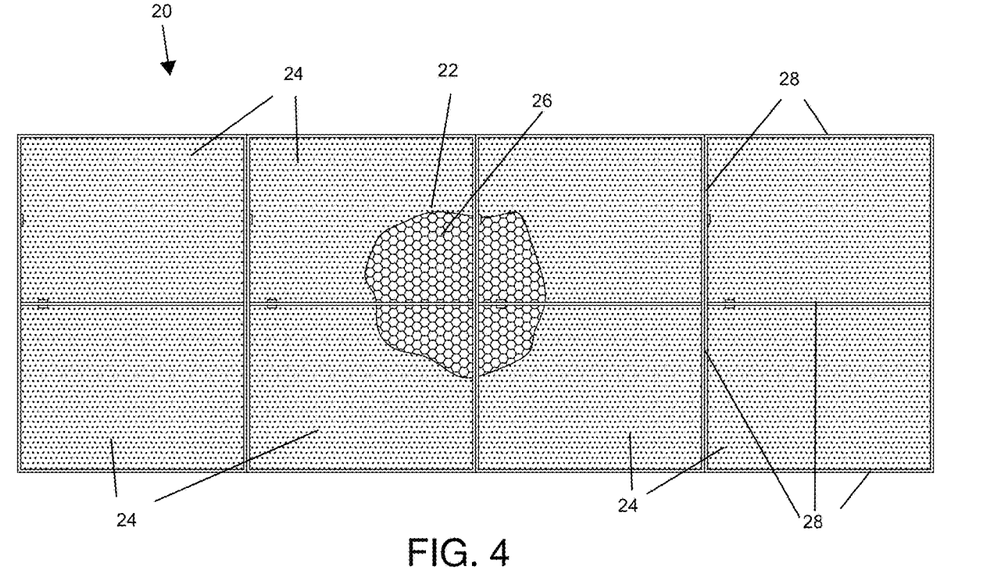
FIG. 4 is a rear elevation view of a dual screen element depicting a wire mesh, with a partial cutaway showing a perforated steel plate side of the dual screen element.
Figure 5:
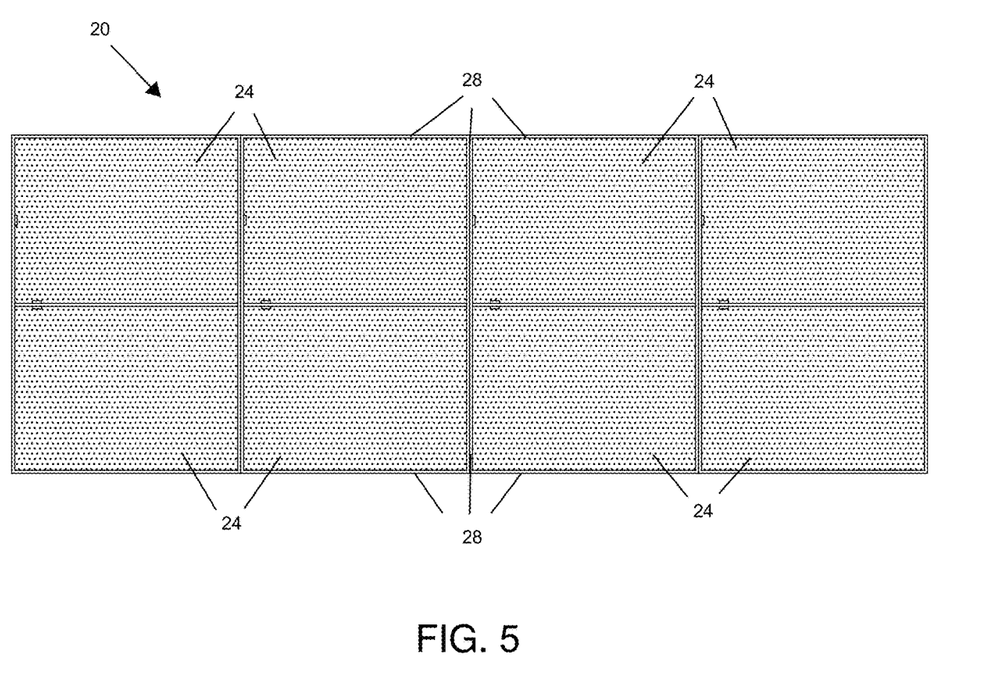
FIG. 5 is a rear elevation view of a dual screen element depicting a wire mesh.
Figures 6A, 6B:
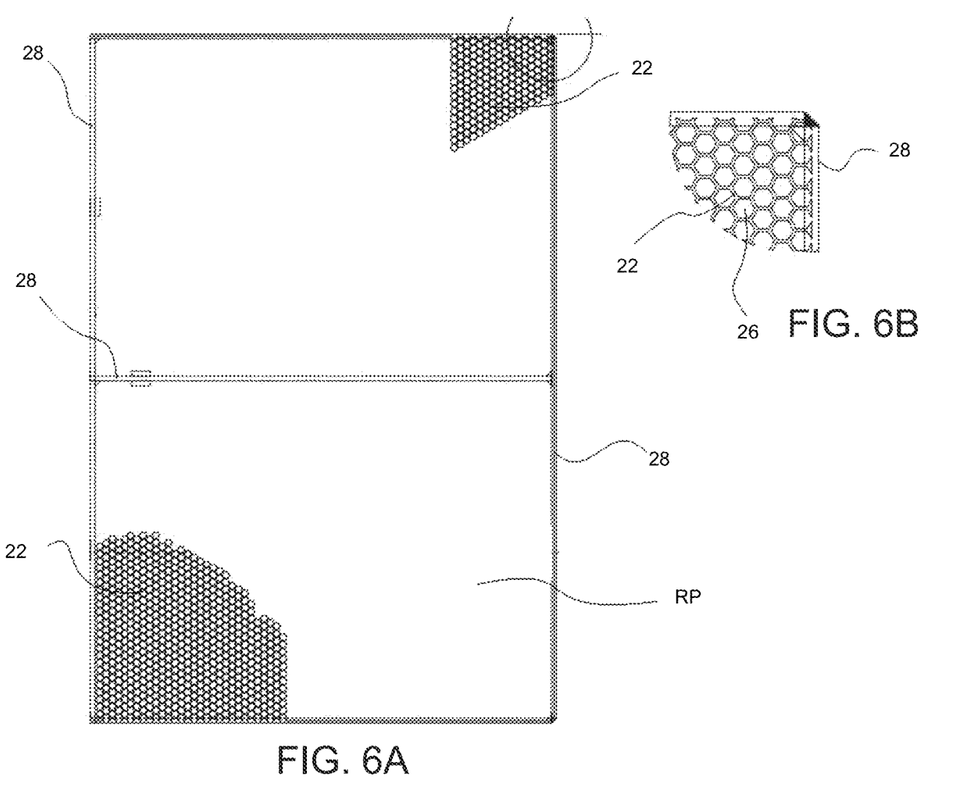
FIG. 6A is a front elevation view of a dual screen element depicting a perforated steel plate side with a refractory particulate buildup on a surface of the plate.
FIG. 6B is a detail view of the perforated steel plate carried in a frame.

The perforated steel plate 24 of the first stage has a plurality of apertures 26 disposed in a spaced apart relation extending through a front to a back surface of the perforated steel plate 24. The apertures 16 (perforations) are dimensioned so that the apertures 16 are smaller than that of a pitch in the SCR catalyst bed 14. The perforations, or apertures 26 may be any geometric shaped opening, such as round, hexagonal, square, and the like. In the preferred embodiment shown, the apertures 26 are hexagonal.

As shown in FIG. 2, the dual screen element 20 is oriented with a top end of the dual screen element 20 oriented in an upstream direction, into the exhaust gas G flow. A bottom end of the dual screen element 20 is oriented in a downstream direction, towards the outlet 18 and the catalyst bed 14. Preferably, a majority of the dual screen element 20 is positioned to overly a horizontal surface of the refractory shaft outlet 18.

In the embodiment shown in FIG. 3, the bottom end of the dual screen element 20 is oriented in an upstream position within the vertical shaft. A top end of the dual screen element 20 is oriented in the downstream position, higher within the vertical shaft.

The system is configured to catch refractory particulate material before it reaches the SCR catalyst bed 14. The dual screen element 20 oriented at a sloped angle within the upstream exhaust gas flow G to the SCR catalyst bed 14.

The dual screen element 20 is disposed at a sloped angle to improve performance for one or more of the following reasons: 1) a surface area of the apertures of the dual screen element 20 is increased for reduced pressure drop in the exhaust gas flow G across the dual screen element 20; 2) exhaust gas flow G kinetics passing through the dual screen element 20 deflect RP striking the first stage of the dual screen element 22 in a downward direction; 3) air cannon 30 are better able to assist in reducing RP deposit accumulation; and the dual screen element improves the exhaust gas flow G distribution across the catalyst bed 14.

With the increased surface area of the dual screen element 20 oriented into the exhaust gas flow G, an exhaust gas passage area, representing a summation of the area of each of the plurality of apertures 26 through the perforated steel plate 22, may be selected to correspond to a cross sectional flow area bounded by a shaft of the refractory exhaust gas to minimize the pressure drop across the dual screen element 20. Likewise, the pore area of the wire mesh screen 24 may be matched to correspond to the cross-sectional flow area bounded by the shaft of the refractory exhaust gas ducts to minimize the pressure drop across the dual screen element 20.

In the case of the exhaust gas flow G kinetics passing through the angled orientation of the dual screen element 20 angles a face of the perforated steel plate 20, such that RP carried in the exhaust gas flow G impact a plate area of the perforated steel plate 20 deflect the RP in a downward direction. The downwardly urged RP will have a tendency, along with gravity and the airflow dynamics at the bottom of turn of the refractory, to accumulate on the horizontal section of the outlet 18. These deposits may then be cleaned from the area via the access door 15.

Air cannon 30 effectiveness is also improved by orienting a blast force from the air cannon 30 in a downward orientation, relative to a front surface of the dual screen element 20, to direct deposits of RP collecting on the first stage towards the floor where the RP deposits are unable to have a negative impact on catalyst bed 14 performance. In some cases, the air cannon blasts sufficiently break up the deposits so that they RP fines may be entrained in the exhaust gas flow G through the SCR without significant deposition in the SCR catalyst bed 14.

In addition, the perforated plate RP screen improves the exhaust gas flow distribution across the SCR catalyst bed 14.

While the first stage of the dual screen 20 of the present invention have been used in SMR operations, operators have nonetheless encountered limitations in the effectiveness of the perforated plate 22 when used alone. Despite the ability of the perforated plate 22 in containing RP deposits, the catalyst bed 14 would also become occluded with RP deposits. While the perforated plate 22 stopped a large portion of the RP buildup, air cannons 30 were not utilized with the perforated plate 22 to dislodge the RP buildup. However, when used with air cannon 30, the system successfully prevented the RP from passing through the perforated plate 22 screen and the refractory fibers (for the most part) were also stopped by the perforated steel plate 22.

In our research, we have discovered that the shape of this RP buildup often manifested as long, thin, and stringy deposits, hereinafter refractory fibers (RF). Over time these RF found their way through the apertures 26 and in turn, became deposited on the catalyst bed 14. The pulsing action of the exhaust gas flow G on the perforated plate 22 induce vibrations on the perforated plate 22 that facilitated the passage of the RF through the apertures 26 and subsequent accumulation on the catalyst bed 14. Conventional thinking suggested that the diameter of the apertures 26 was too large to stop the passage of the RF accumulations, thereby the indicating solution necessitated a reduction in the perforated plate aperture diameter.

Figure 7:
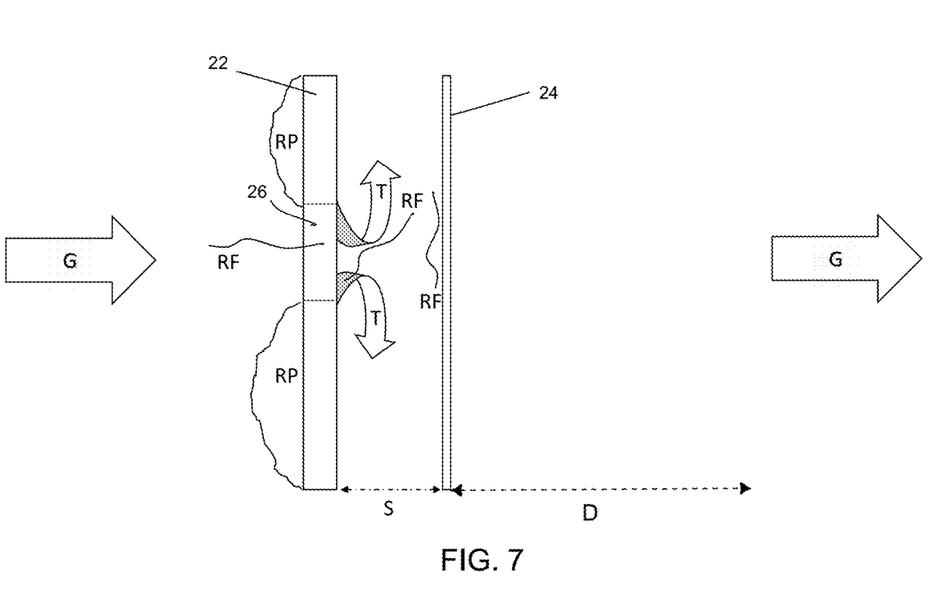
FIG. 7 is a schematic view of a refractory fiber passage through the dual screen element.

We believe that the stringy properties of these RF would catch the other RP and make the buildup worse. As such, we believe that with insertion of the second stage wire mesh 24 in parallel with the perforated plate 22 as a first stage, the dual screen element 20 would be more effective to stop the passage of the RF material. As seen in FIG. 7, the dual screen element 20 and the turbulent exhaust gas flow T downstream of the aperture 26 of the perforated plate 22, causes the RF to rotate so that wire mesh 24 has a better opportunity to capture the RF strands. The effectiveness of the dual screen element 20 is also improved where the orientation of the dual screen element 20 is such that the RF strands entrained in the exhaust gas flow G are non-perpendicular to the wire mesh 24.

Accordingly, we believe that the following; system will be beneficial in the containment of RP and RF to prevent passage of and accumulation of these deposits on the SCR catalyst bed 14. As seen in FIG. 7 filtration of the RP is primarily achieved in the first stage, followed by a second stage filtration of the RF in the second stage. The addition of the second stage wire mesh screen 22, having much smaller apertures than the plurality of apertures 26 in the perforated plate 22. As indicated previously, the dual screen element 20 is disposed at an angle in the upstream exhaust gas flow G from the SCR catalyst bed 14. The dual screen element 20 is preferably fitted with an air cannon 30 to move/push down and break up RP deposits and RF accumulations on both stages of the dual screen element 20, where they may settle out or become entrained in the exhaust gas flow through the catalyst bed 14 without significant deposition on the catalyst bed 14 as is currently experienced.

Preferably the perforated plate 22, would have an aperture 26 size of less than 5 mm, on the order of 1-5 mm, and preferably 1.9 mm. Likewise, we believe that an open area ratio (OAR) for the perforate plate should be greater than 30%, preferably on the order of 30-80%, and more preferably about 44%. A plate thickness for the perforated steel plate should be less than 18 gauge, preferably between 10 and 18 gauge, more preferably about 16 gauge is more durable and rigid and able to catch larger RP. Due to the durability of its construction with the frame elements 28, the perforated plate 22 can withstand higher velocity air cannon 30 blasts, which is necessary to move and break up larger RP deposits accumulating on the first stage 22 of the dual element screen 20.

The wire mesh screen 24, of the second stage would have an opening size on the order of less than 0.2 mm, preferably between 0.002-0.2 mm, more preferably about 0.0345 mm. The wire mesh screen 24 should have an OAR of greater than 30%, preferably in the range of 30-80%. The strand size, or wire diameter of the wire mesh screen 24, should be greater than 0.014 mm, preferably in the range of 0.014-0.1 mm and more preferably about 0.028 mm is suitably sized to catch the finer RP and refractory fibers. Although less durable than the perforated plate 22 of the first stage, positioning of the wire mesh screen 24 by the downstream separation S from the first stage perforated plate 22, is protected by the more durable first stage which collects the major buildup of RP. The wire mesh screen 24 is also sufficiently durable to withstand cleaning with the utilization of a lower velocity, higher volume air cannon 30 blasts that can break up and move the smaller RP and stranded particles.

The combination of the perforated plate 22 and wire mesh screen 24 allows for necessary filtration and cleaning of RP and FP from the refractory exhaust gas flow G. Selection of a desired OAR and angled orientation of the dual screen element 20, optimum pressure drop across the dual stage element 20 can be maintained.

The perforated plate 22 screen also acts as an exhaust gas flow G aid which benefits the performance of the SCR catalyst bed 14. Our research suggests that the more uniform the air flow through the SCR catalyst bed 14, the better the performance of the SCR in reducing NOx emissions. While being a flow aid the described system does produce a slight turbulent flow zone downstream from the first stage perforated plate 22. This turbulent flow zone helps prevent the RF from being carried perpendicular to the second stage wire screen 24 which makes the RF easier to catch by the second stage wire mesh screen 24. The frame elements 28 are selected so that the perforated steel plate 22 and the wire mesh screen 24 have a separation distance S where the airflow will still exhibit turbulence characteristics. The separation distance S will vary depending upon the aperture size, exhaust gas flow rate, temperature, and flow characteristics of the refractory shaft.

The utilization of air cannon 30 can produce enough cleaning power to break the RF accumulations apart, significantly reducing the accumulation potential because the RF accumulations is broken into many pieces as RP. Preferably, air cannons 30 are utilized on both a front end and a back end of the dual screen element 20. The air cannon 30 on the front end are configured to be directed at high pressure low volume to clear accumulation of the RP. The air cannon 30 blast directed at the back end of the second stage wire screen mesh 24 is regulated to a low pressure high volume blast. In our experience, the regulated operation of the air cannon 30 sufficiently breaks apart the RF so that they may be entrained in the exhaust gas flow G and carried through the catalyst bed 14 of the SCR.

The wire mesh of second stage screen 22 is designed to catch even the finest buildup and the employment of a manual lancing, or the air cannon 30 may be used to push the new buildup carried on the secondary screen 24 to the bottom of the outlet duct 18, where it may be accessed and removed through portal 17 or further break the RF into smaller pieces for passage through the SCR catalyst bed 14.

We have also discovered that the spacing D between the SCR catalyst bed 14 and the dual element screen 20 is also a consideration. The dual screen element 20 may be positioned so that exhaust gas flow G, when buildup does occur, has an opportunity to recover and still provide a laminar exhaust gas flow G distribution to the SCR catalyst bed 14.

As indicated previously, SCR system performance is enhanced by increasing the effective surface area of the screen element 20. The effective surface area of the screen element 20 is increased by the angle of the screen element 20 relative to the exhaust gas flow G. Also, the larger effective surface area of the screen element 20 in relationship to the SCR exhaust gas flow path, the less impact buildup on the screen element 20 will have, particularly where a spacing between the screen element 20 and the SCR catalyst bed 14 is great enough to allow recovery of the exhaust gas flow G from a turbulent flow to a laminar exhaust gas flow G with the screen element 20 positioned upstream from the SCR catalyst bed 14.

In the embodiment shown in reference to FIG. 2, the screen element 20 is positioned downstream from a 90-degree turn, preceding the catalyst bed 14. Collection of the deposits may occur within the outlet 18 area of the refractory, where it may be removed through the access door 15 and portal 17.

In the embodiment shown in reference to FIG. 3, the screen element 20 is positioned in a vertical shaft preceding the 90 degree turn and the catalyst bed 14 and before the guide vanes 16 of the 90-degree turn. Positioning the screen element 20 within the vertical shaft of the 90 degree turn may provide the following benefits and considerations: 1) the angled orientation of the screen element 20 can substantially increase the effective surface area of the screen element 20 verses positioning at an inlet face of SCR by a multiple of about 1.5 times. Stated differently, the screen element 20 in this position can accumulate a buildup of 50% of the screen element flow capacity and still have a residual exhaust gas flow G capacity to maintain the full exhaust gas flow G through the screen element 20.

As will be appreciated the sloped orientation of the screen element 20 to increase effective flow area of the screen element 20 may be advantageous for the employment of a single stage screen element 20 in advance of the SCR 4. In the non-limiting embodiment shown, the increased distance D of the screen element 20 from the SCR catalyst bed 14 allows the turbulent exhaust gas flow following passage through the screen element 20 to correct and ensure a proper flow distribution of the exhaust gas flow to the SCR catalyst bed 14 by providing this added exhaust gas flow stabilization distance D. The perforated plate 22 of the first stage is also a flow aid and may prove more effective when positioned before the turning vanes 16 to adjust the angle for improved exhaust gas flow G though the 90-degree duct bend.

It should be understood, of course, that the foregoing relates to exemplary embodiments of the invention and that modifications may be made without departing from the spirit and scope of the invention.

What is claimed is:

1. An apparatus for reducing particulate blockage of a catalyst bed in a coal fired refractory, comprising:
   a dual element screen having a first stage and a second stage disposed within a frame at a desired separation distance between the first stage and the second stage;
   the first stage formed as a perforated steel plate having a plurality of apertures defined through a thickness of the perforated steel plate, the plurality of apertures defined in a spaced apart relation throughout a surface of the first stage, the perforated steel plate having a first open area ratio (OAR) between the plurality of apertures and a surface of the perforated steel plate of at least 30%; and
   the second stage formed as a wire mesh screen having a second OAR between a pore and a surface area of the wire mesh screen of at least 30%.

2. The apparatus of claim 1, wherein the first OAR is between 30% and 80%.

3. The apparatus of claim 2, wherein the second OAR is between 30% and 80%.

4. The apparatus of claim 3, wherein a size of the apertures is between 1 mm to 5 mm.

5. The apparatus of claim 4, wherein the size of the apertures is about 1.9 mm.

6. The apparatus of claim 1, wherein a pore opening of the pore is between 0.002 mm and 0.2 mm.

7. The apparatus of claim 6, wherein the pore opening is 0.0345 mm.

8. The apparatus of claim 1, wherein a thickness of the perforated steel plate is between 10 gauge and 18 gauge.

9. The apparatus of claim 8, wherein the thickness of the perforated steel plate is about 16 gauge.

10. The apparatus of claim 1, wherein a wire thickness of the wire mesh screen is between 0.14 mm to 0.1 mm.

11. The apparatus of claim 1, wherein a wire thickness of the wire mesh screen is 0.28 mm.

12. The apparatus of claim 1, wherein the desired separation distance provides a turbulence zone between the perforated steel plate and the wire mesh screen, whereby a turbulent exhaust gas flow in the turbulence zone orients a particulate fiber entrained in an exhaust gas flow in a non-perpendicular contact with the wire mesh screen.

13. A system for reducing particulate blockage of a catalyst bed in a coal fired refractory of a steam methane reformer, the coal fired refractory producing an exhaust gas flow in which a quantity of a refractory particulate (RP) contaminant and a stringed refractory fiber (RF) contaminant are carried in the exhaust gas flow, the exhaust gas flow carried within an exhaust shaft of the coal fired refractory having an outlet opening to the catalyst bed, comprising:
   a dual screen element having a first stage, positioned in an upstream direction in the exhaust gas flow, and a second stage positioned in a downstream direction from the first stage, the dual screen element disposed at an offset angle from a longitudinal axis of the exhaust shaft, the dual screen element positioned upstream in the exhaust gas flow from the catalyst bed;
   the first stage formed as a perforated steel plate having a plurality of apertures defined through a thickness of the perforated steel plate, the plurality of apertures defined in a spaced apart relation throughout a surface of the first stage, the perforated steel plate having a first open area ratio (OAR) between the plurality of apertures and the surface of the perforated steel plate of at least 30%; and
   the second stage formed as a wire mesh screen having a second OAR between a pore and a mesh surface area of the wire mesh screen of at least 30%.

14. The system of claim 13, wherein an area of the plurality of apertures is at least equal to a cross sectional area bounded by the exhaust shaft.

15. The system of claim 14, wherein the first stage and the second stage are spaced apart by a separation distance in which a turbulence zone in the exhaust gas flow downstream from the first stage prevents the stringed RF from flowing in a perpendicular orientation relative to the second stage.

16. The system of claim 13, further comprising:
   a first blast of a plurality of air cannon oriented at a front surface of the dual screen element is directed at a high pressure and a low volume to clear accumulation of the RP and the RF from the dual screen element.

17. The system of claim 16, further comprising:
   a second blast of the plurality of air cannon oriented on a back surface of the dual screen element is regulated as a low pressure and a high-volume blast.

18. The system of claim 17, wherein at least one of the first blast and the second blast convert the RF captured by the dual screen element to a particulate for entrainment with the exhaust gas flow through the catalyst bed.

19. The system of claim 13, wherein the dual screen element is positioned in a vertical exhaust shaft upstream of the exhaust gas flow from a turn to a horizontal exhaust shaft.

20. The system of claim 13, wherein the dual screen element is positioned in a horizontal exhaust shaft downstream from a turn from a vertical exhaust shaft.

21. A system for reducing particulate blockage of a catalyst bed in a coal fired refractory, the coal fired refractory producing an exhaust gas flow in which a quantity of a refractory particulate contaminant are carried in the exhaust gas flow, the exhaust gas flow carried within an exhaust shaft having an outlet opening to the catalyst bed, comprising:
   a dual screen element having a first stage, positioned in an upstream direction in the exhaust gas flow, and a second stage positioned in a downstream direction from the first stage, the dual screen element disposed at an offset angle from a longitudinal axis of the exhaust shaft, the dual screen element positioned upstream in the exhaust gas flow from the catalyst bed;
   the first stage formed as a perforated steel plate having a plurality of apertures defined through a thickness of the perforated steel plate, the plurality of apertures defined in a spaced apart relation throughout a surface of the first stage, when disposed at the offset angle, the perforated steel plate having an aperture opening area at least equal to a cross sectional area bounded by the exhaust shaft; and
   the second stage formed as a wire mesh screen spaced apart from the first stage by a separation distance.

22. The system of claim 21, wherein the separation distance provides a turbulence zone in the exhaust gas flow downstream from the first stage, wherein the turbulence zone prevents a stringed refractory fiber contaminant from flowing in a perpendicular orientation relative to the second stage.

23. The system of claim 21, the dual screen element, further comprising:
- a first open area ratio (OAR) between the plurality of apertures and the surface of the perforated steel plate of at least 30%; and
- second OAR between a pore and a mesh surface area of the wire mesh screen of at least 30%.

* * * * *